(12) United States Patent
Shah

(10) Patent No.: US 7,624,925 B2
(45) Date of Patent: Dec. 1, 2009

(54) MEMBERSHIP CARDS

(75) Inventor: Ashesh C. Shah, Brookline, MA (US)

(73) Assignee: Get Solo, LLC, Cambridge, MA (US)

( * ) Notice: Subject to any disclaimer, the term of this patent is extended or adjusted under 35 U.S.C. 154(b) by 462 days.

(21) Appl. No.: 11/355,036

(22) Filed: Feb. 14, 2006

(65) Prior Publication Data

US 2007/0007348 A1   Jan. 11, 2007

Related U.S. Application Data

(60) Provisional application No. 60/698,142, filed on Jul. 11, 2005.

(51) Int. Cl.
*G06K 7/10* (2006.01)
(52) U.S. Cl. .................. 235/462.01; 235/379; 235/487; 705/14
(58) Field of Classification Search ............ 235/462.01, 235/379, 487; 705/14
See application file for complete search history.

(56) References Cited

U.S. PATENT DOCUMENTS

| | | | |
|---|---|---|---|
| 5,682,030 A | 10/1997 | Kubon | |
| 6,830,178 B2 * | 12/2004 | Jimenez | 235/379 |
| 7,249,715 B1 * | 7/2007 | Lambright | 235/487 |
| 7,353,996 B2 * | 4/2008 | Goodman et al. | 235/462.01 |
| 2002/0060246 A1 | 5/2002 | Gobburu et al. | |
| 2004/0026915 A1 * | 2/2004 | Thompson et al. | 283/51 |
| 2004/0124244 A1 * | 7/2004 | Rynn | 235/487 |
| 2004/0140361 A1 | 7/2004 | Paul et al. | |
| 2005/0061878 A1 | 3/2005 | Barenburg et al. | |
| 2008/0052172 A1 * | 2/2008 | Cohagan et al. | 705/14 |

FOREIGN PATENT DOCUMENTS

| | | |
|---|---|---|
| EP | 0459789 A2 | 12/1991 |
| EP | 0736854 A1 | 10/1996 |
| FR | 2652935 A1 | 4/1991 |
| GB | 2409923 A | 7/2005 |
| WO | WO 2007/008670 A1 | 1/2007 |

OTHER PUBLICATIONS

Online Document, Retrieved on Apr. 18, 2007 from www.mybarcodecard.com, 2 pages.
Online Document, Retrieved on Apr. 13, 2007 from www.mybarcodecard.com, 12 pages.
Online Document, Internet Archive WayBackMachine, Retrieved from http://www.archive.org/web/web.php, document dated Feb. 22, 2001, 1 page.

(Continued)

*Primary Examiner*—Allyson N Trail
(74) *Attorney, Agent, or Firm*—Hamilton, Brook, Smith & Reynolds, P.C.

(57) ABSTRACT

A code carrier, on which multiple barcodes corresponding to independent entities are printed or stored, is disclosed. The barcodes are arranged on the code carrier and angled such that a barcode reader may individually read a desired barcode and the barcodes are surrounded in distinctive colors. A code carrier provider maintains a data base of users and their corresponding barcode identifiers.

22 Claims, 17 Drawing Sheets

OTHER PUBLICATIONS

One-der-Card . . . the power of many, the ease of One. [online], [retrieved on Jan. 26, 2006], Retrieved from http://www.one-der-card.com/homepage.htm. ©2003.

Una-Card The Universal Points Card™. [online], [retrieved on Jan. 26, 2006], Retrieved from http://www.una-card.com/benefits.html.

Cook, A. M., "Effective Label Design," *ID Systems: European Edition*, 2. 21-24 (1993).

Personalized credit card design. [online], [retrieved on Feb. 8, 2007], Retrieved from http://www.business-idea.com/ShowPosting.asp?ID=2059, p. 1 of 2.

\* cited by examiner

Front of Card

Reverse of Card

MEMBERSHIP CARDS

RELATED APPLICATION

This application claims the benefit of U.S. Provisional Application No. 60/698,142, filed Jul. 11, 2005. The entire teachings of the above application are incorporated herein by reference.

BACKGROUND OF THE INVENTION

Membership cards, such as health club cards, video rental cards, library cards, promotional cards, discount cards, and loyalty cards (e.g., frequent flyer cards, grocery discount cards, and the like) are widely used. The proliferation of such membership cards has escalated to the point where 63% of the population across Europe possesses two or more loyalty cards, and nearly 80% of all grocery transactions in the U.S. take place with a membership card (AC Nielsen).

Membership cards may include a variety of different indicia to identify the card, the individual using the card, a membership account, an expiration date, and other information. The indicia may include a string of alphanumeric characters, a barcode, or an encoded magnetic strip attached to the card. In the case where barcodes are used as the indicia, an organization typically creates a membership card that includes only one such barcode.

Vendors that wish to track member activity typically want to ensure that each user of an account receive a membership card that is appropriately associated with the membership account. Unfortunately, these cards have taken over the space in people's wallets and purses.

Vendors have also issued smaller versions of their loyalty cards that are designed to be attached to a keychain. These devices contain only the basic indicia representing the membership identifier, such as a single barcode containing the owner's membership number. This has resulted in cumbersome key chains that burden the consumer just as much as the cards. The typical consumer now carries several cards in his wallet and a plethora of key chain tokens. Furthermore, while consumers are being bombarded with new card offers daily, they still have to carry credit cards, driver's licenses, and often choose to carry pictures of their loved ones as well.

In one attempt to reduce the number of such cards carried by an individual, bar code numbers are provided to a card provider that prints several bar codes on one card. See www.one-der-card.com.

SUMMARY OF THE INVENTION

The invention provides a mechanism by which all of the information required to interact with existing merchant loyalty programs may be unified into one easy to carry accessory. This accessory may replace several memberships cards along with a personal photograph, and may be designed to operate with barcode readers from several different organizations that do not have a partnership or pre-existing relationship.

The invention also represents a vehicle for companies that do not have a presence in consumers' wallets, and allows them to occupy the much-coveted wallet space. By prominently featuring their brand on the invention, companies can effectively displace existing brands contained on the loyalty cards which are already carried by the consumers.

Card users may avoid having to carry multiple membership cards and key tags by consolidating the relevant information on a single code carrying device. The barcodes corresponding to each organization's membership card are printed on the substrate of the code carrier.

The code carrier may take the shape of a rectangular card, but is not limited to any specific form. The carrier may also take the shape of a key tag (for use with a key chain), or may even be a cover for another device (such as for an MP3 player or wireless telephone). The code carrier may also be an electronic device that displays individual bar codes.

A user of multiple membership cards forwards all relevant information to a code carrier provider. The information includes barcode identifiers in the form of barcodes or data to be converted to barcodes. The provider then arranges the barcodes on the code carrier and forwards it back to the user. The provider may arrange the barcodes in a manner that facilitates each barcode to be individually read by a barcode reader. This may be achieved by arranging the adjacent barcodes at angles, for example, such that no barcode is within ten degrees of rotation from, or directly in line with another barcode. Preferably, the bar codes are surrounded by distinctive colors in order to distinguish the bar codes during scanning of individual codes. The layout of the barcodes may be performed manually or by an automated system.

In addition to the barcodes, the user may forward sets of data containing other useful information to be printed on the code carrier, for example, frequent flyer account numbers or important telephone numbers. The code carrier may also be customized with the addition of a personalized graphic, such as a photograph that the user would normally carry in his wallet. Permanent product or establishment coupons may also be provided on the code carrier to, for example, assure discounts or awards with respect to particular products. All of the necessary information may be forwarded in person, by mail, or even via the internet. The user may establish an account with the code carrier provider such that the data is stored for use in obtaining subsequent carriers.

Upon receiving the code carrier, the user may present the code carrier at a merchant's location for the reading of an individual barcode. To assist the barcode reader in reading a desired barcode, the user may block all barcodes except the relevant barcode, for example, by blocking some of the barcodes with the user's hand.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. It should be understood that the following description only illustrates the preferred embodiments of the invention and should not be used to narrowly interpret the scope of the invention. In addition, various aspects of the invention are described below. It should be understood that these various aspects might be used in a variety of different combinations. Therefore, the illustrative embodiments described below are not intended to show all aspects of the invention, but are rather used to describe a few embodiments of the invention.

Figure 1:
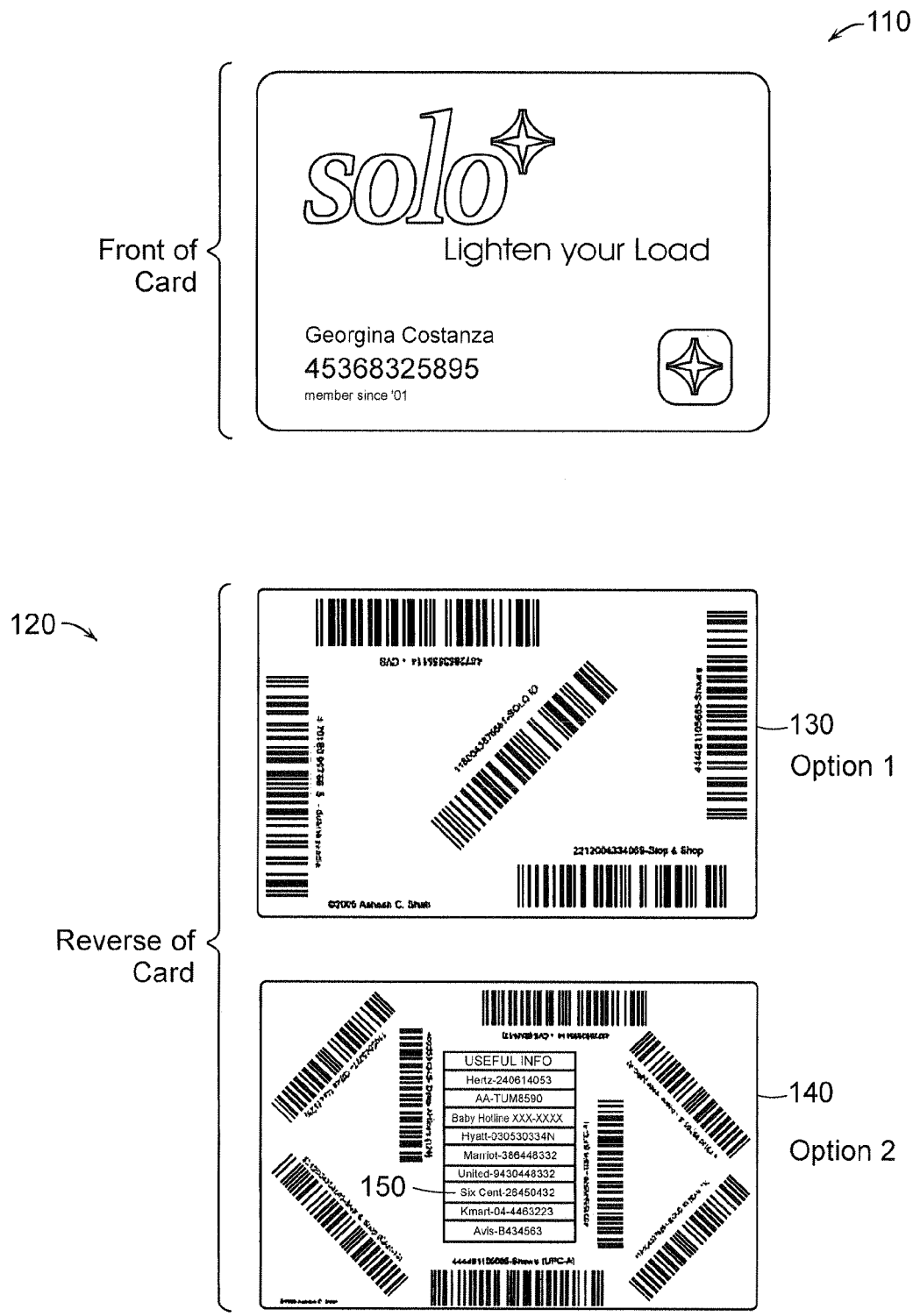
FIG. 1 is a view of a code carrier in the form of a rectangular card with barcodes arranged in accordance with an embodiment of the invention.

FIG. 1 shows a first and a second side 110, 120 of a code carrier in the form of a rectangular plastic card. On the first side 110 of the card, a standard advertising image may be placed to mark the brand of the code carrier provider. This image would be pre-determined in this embodiment, while the reverse of the card would be customized on a consumer-by-consumer basis. The second side 120 of the card contains the information forwarded by the card user that is relevant to his needs. For example, if the user wanted to include five barcodes on the code carrier, then the layout of the card may resemble Option 1 130. If the user wanted to include eight barcodes and an additional set of data 150, representing the user's useful information, then the layout of the card may resemble Option 2 140. The layout of the barcodes and of the other information may be determined by the algorithm 900 outlined in FIG. 9.

Figure 2:
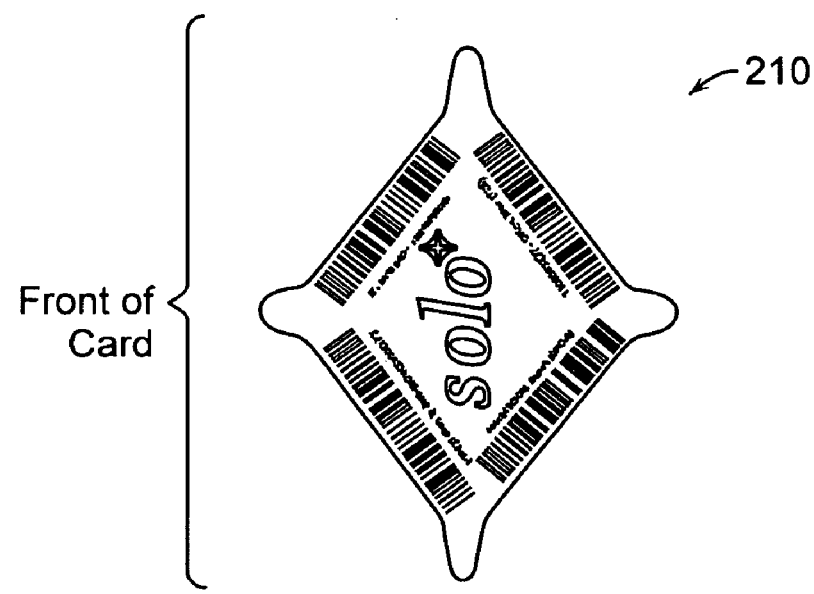
FIG. 2 is a view of a code carrier in the form of a diamond shaped key tag with barcodes arranged in accordance with an embodiment of the invention.
Figure 2:
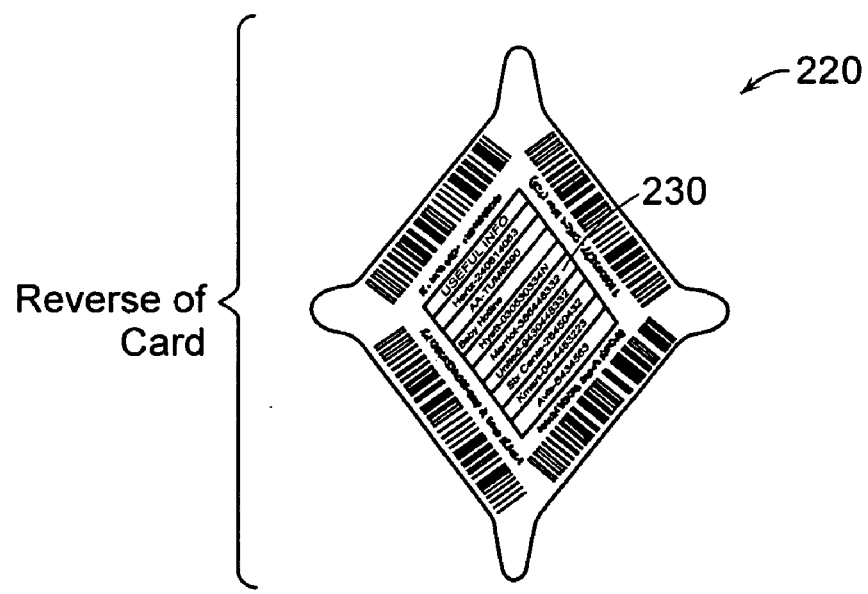

FIG. 2 shows a first and a second side 210, 220 of a code carrier in the form of a diamond shaped key tag. The embodiment's shape allows it to be easily carried on a key chain. The first side 210 of the key tag provides a small area where a standard advertising image may be placed to mark the brand of the code carrier provider. The edges of the key tag may be customized on a user-by-user basis. The second side 220 of the key tag may also be customized on a user-by-user basis and may contain an additional set of data 230 representing the user's useful information. The layout of the barcodes and of the other information may be determined by the algorithm 900 outlined in FIG. 9.

Figure 3:
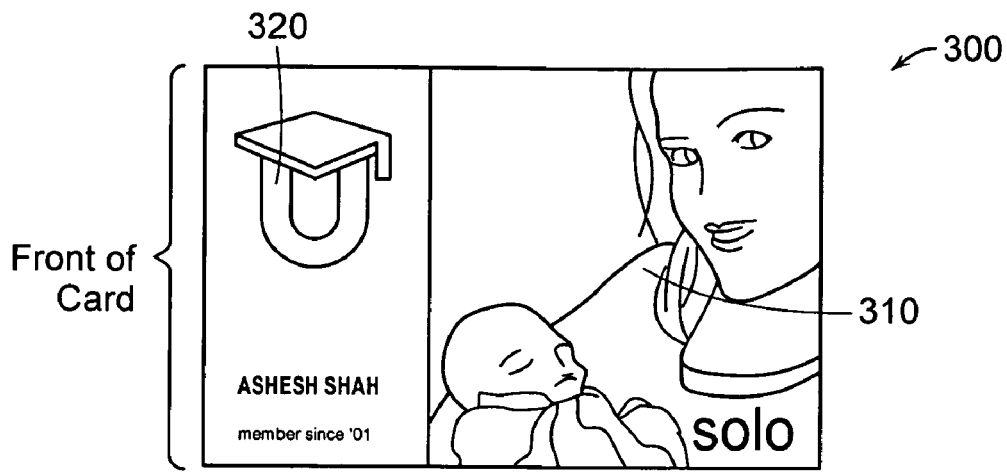
FIG. 3 is a first side of a code carrier containing a personalized graphic in accordance with an embodiment of the invention.
Figure 4:
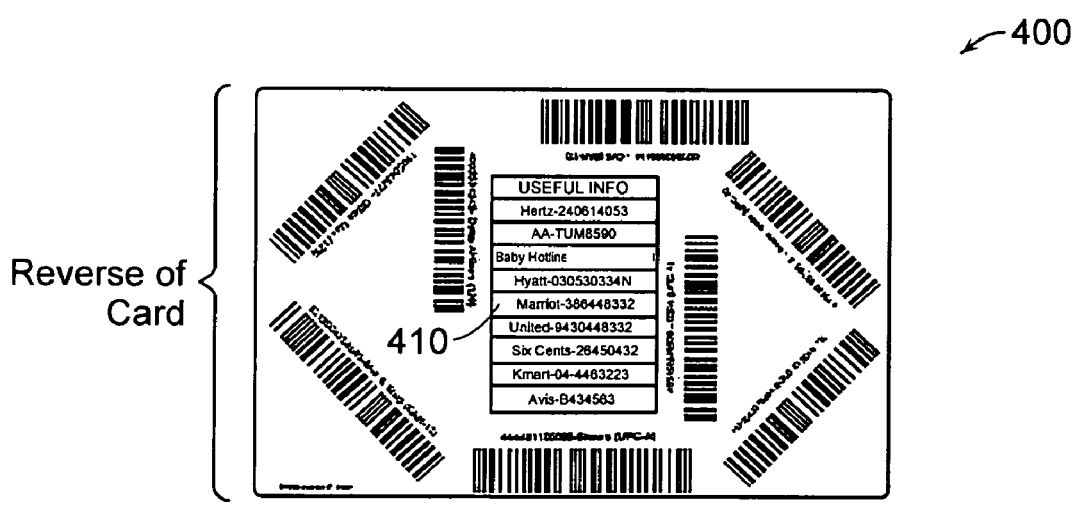
FIG. 4 is a second side of the code carrier of FIG. 3.

FIG. 3 and FIG. 4 show a first and a second side 300, 400 of a code carrier in the form of a rectangular plastic card. On the first side 300 of the card, the user's personal photograph or graphic 310 (e.g., the woman and child on the front of the card) may stand alone or be coupled with a small section containing advertising or branding of a sponsoring organization 320 (e.g., the dark area to the left of the woman and child containing the U-shaped logo). This information may vary by user and requires the forwarding of additional information to the code carrier provider. The second side 400 of the card contains the information forwarded by the user that is relevant to his needs. If the user wanted to include eight barcodes and an additional set of data 410, representing the user's useful information, then the layout of the card may resemble FIG. 4. The layout of the barcodes and of the other information may be determined by the algorithm 900 outlined in FIG. 9.

Figure 5:
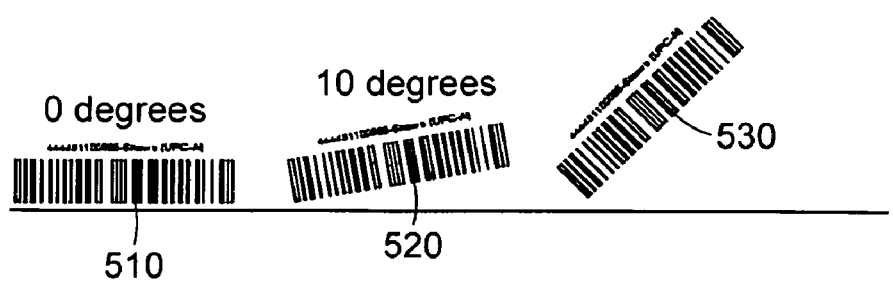
FIG. 5 shows a method by which the orientation angle of a barcode may be determined.

FIG. 5 shows how the orientation angle of a barcode may be determined. The orientation angle is a relative angle measurement and refers to the rotational angle between two barcodes. The bottom edge of a first barcode determines a baseline from which the angle is measured. The baseline reference is then compared to the bottom edge of a second barcode. The angle between the two bottom edges determines the orientation angle. For example, a first barcode 510 in FIG. 5, marked zero degrees, sets a baseline for comparison. A second barcode 520, pivoting on its bottom left corner, creates a ten degree angle of orientation relative to the first barcode 510. A third barcode 530 is rotated further and creates a forty-five degree angle of orientation relative to the first barcode 510. This concept is utilized in the algorithm 900 outlined in FIG. 9.

The orientation angle between barcodes helps to separate the barcodes from each other, and to create a mechanical block to linear and fixed orientation barcode scanners. Because these types of barcode scanners, or readers, look for contiguous and linear patterns of high energy absorption and low energy absorption indicated by the reflection of light beams against dark and light surfaces (the vertical bars in a barcode), any barcode or pattern that is not substantially parallel to the desired barcode will be discarded or ignored. Furthermore, as the user of the invention will most likely rotate the code carrier such that the barcode to be read is aligned with the scanner, the other barcodes on the code carrier will be out of sync with the scanner, and therefore ignored. For example, a scanner aligned with the first barcode 510 will most likely not be able to read the complete patterns put forth by the second barcode 520 and the third barcode 530.

Figure 6:
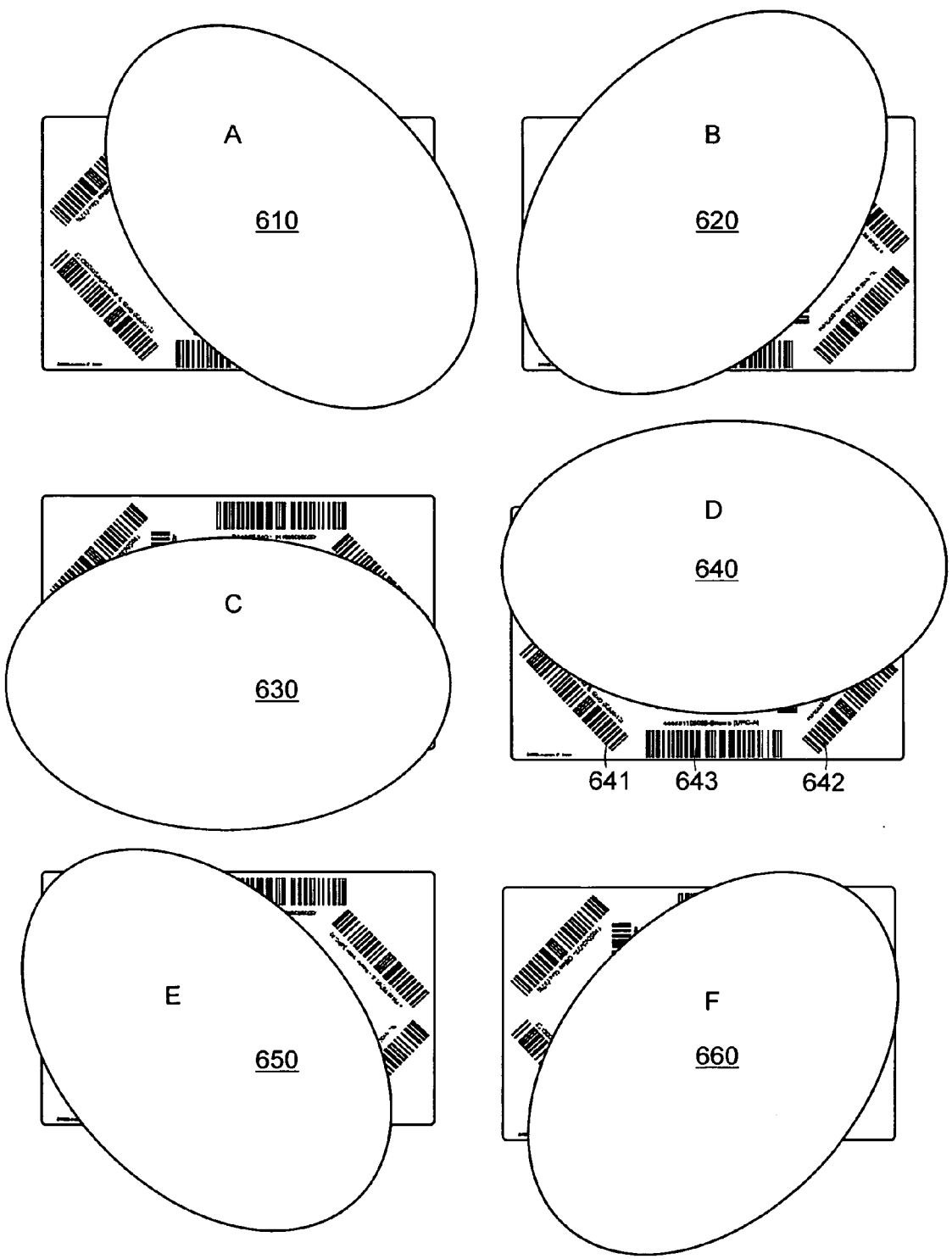
FIG. 6 shows how the code carriers in FIGS. 1 and 4 may be held with one hand to block all but the relevant barcode.

FIG. 6 demonstrates a mechanical obstruction mechanism designed to help barcode scanners read a desired barcode. The grey ovals 610, 620, 630, 640, 650, 660 demonstrate how the palm of a user's hand and their fingers naturally cover a majority of the barcodes with the exception of the desired barcode. The notion is not to force the user to always grip the invention in such a way as to cover the barcodes, but to simply reduce the number of barcodes displayed. The combination of several physical and layout factors will enable the user to present the appropriate barcode to the corresponding merchant. For example, grey oval 640 covers five barcodes, leaves two barcodes 641, 642 partially obstructed, and one barcode 643 fully exposed. This, coupled with the orientation angle defined in FIG. 5, helps to ensure that the desired barcode 643 is read. The algorithm 900 outlined in FIG. 9 further refines this approach.

Figure 7:
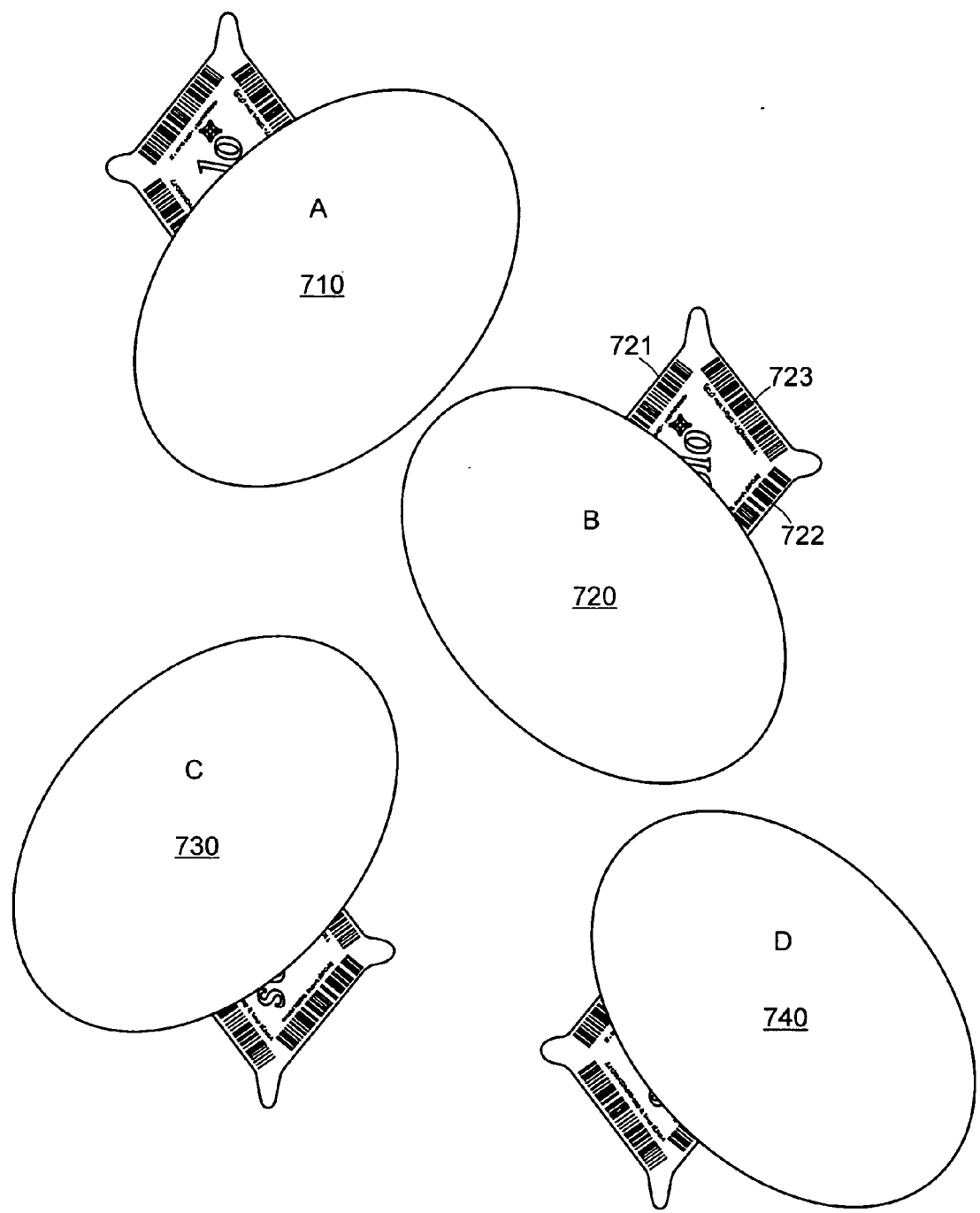
FIG. 7 shows how the code carrier in FIG. 2. may be held with one hand to block all but the relevant barcode.

FIG. 7. demonstrates a mechanical obstruction mechanism designed to help barcode scanners read a desired barcode. The grey ovals 710, 720, 730, 740 demonstrate how the palm of a user's hand and their fingers naturally cover a majority of the barcodes with the exception of the desired barcode. The notion is not to force the user to always grip the invention in such a way as to cover the barcodes, but to simply reduce the number of barcodes displayed. The combination of several physical and layout factors will enable the user to present the appropriate barcode to the corresponding merchant. For example, grey oval 720 covers one barcode, leaves two barcodes 721, 722 partially obstructed, and one barcode 723 fully exposed. This, coupled with the orientation angle defined in FIG. 5, helps to ensure that the desired barcode 723 is read. The algorithm 900 outlined in FIG. 9 further refines this approach.

Figure 8:
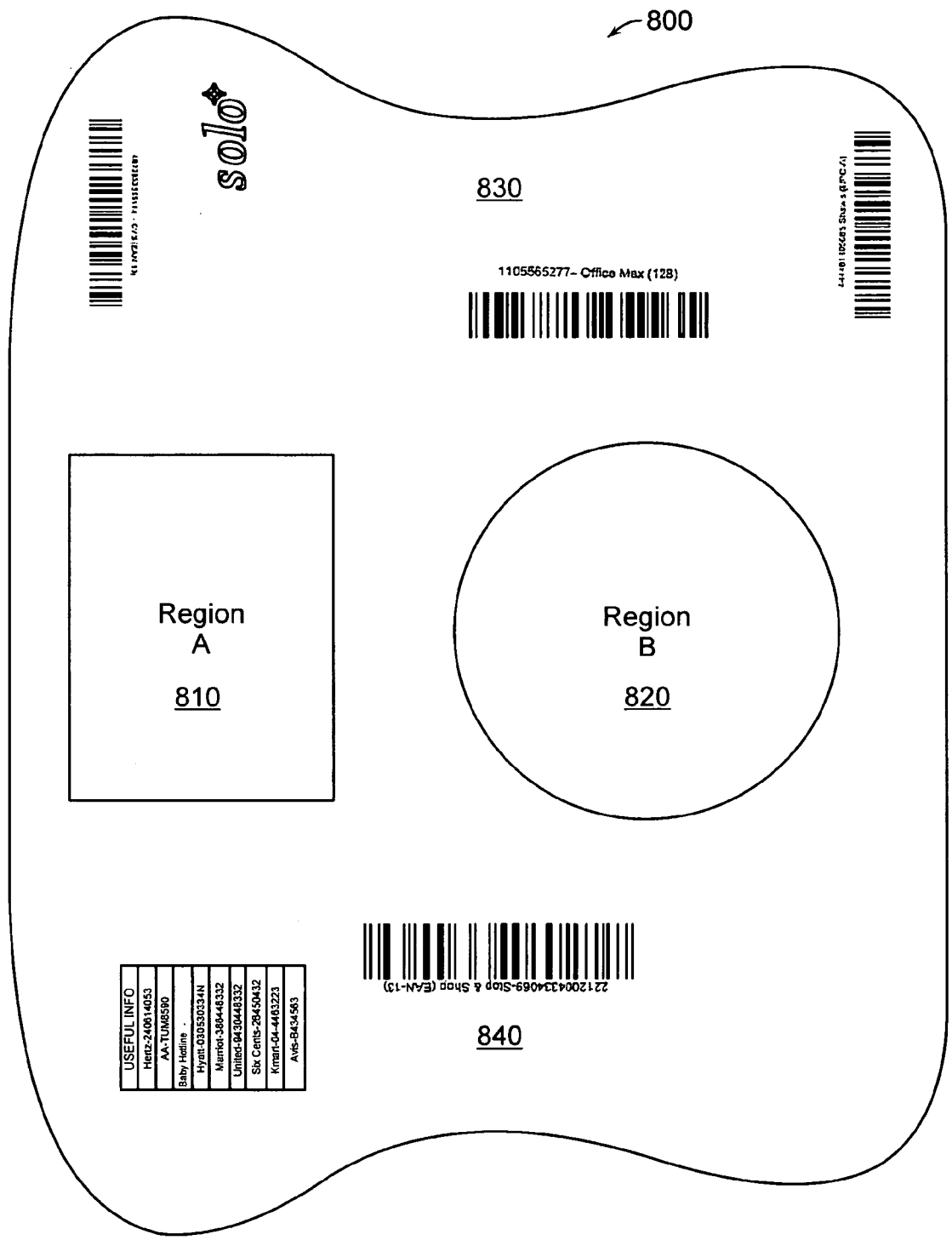
FIG. 8 is a view of a vinyl sheet designed to be a cover for a portable music player or wireless telephone with the barcodes arranged in accordance with an embodiment of the invention.
Figure 9A:
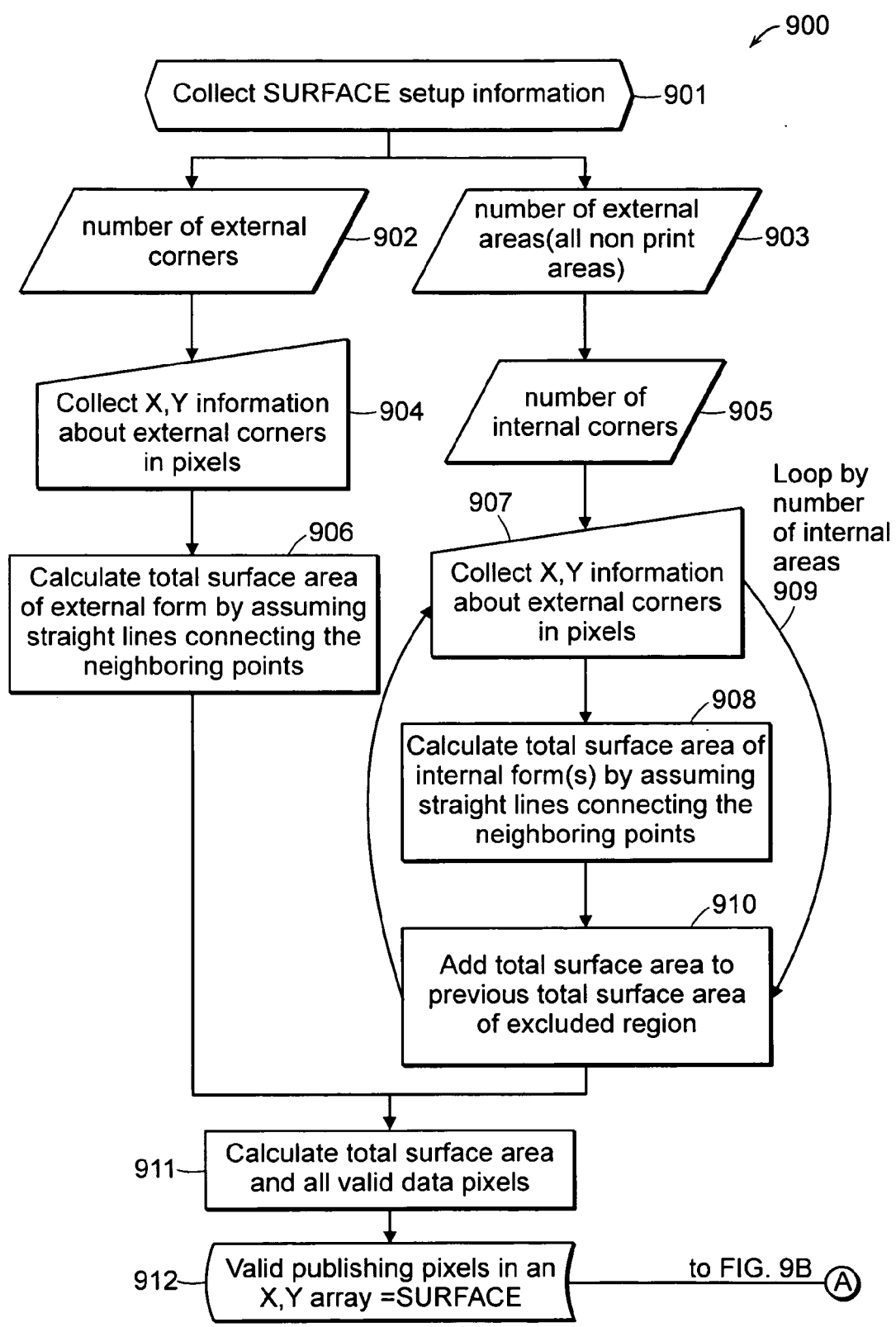
FIG. 9 is a flow chart diagram that depicts an algorithm for determining the layout of barcodes on a code carrier.
Figure 9B:
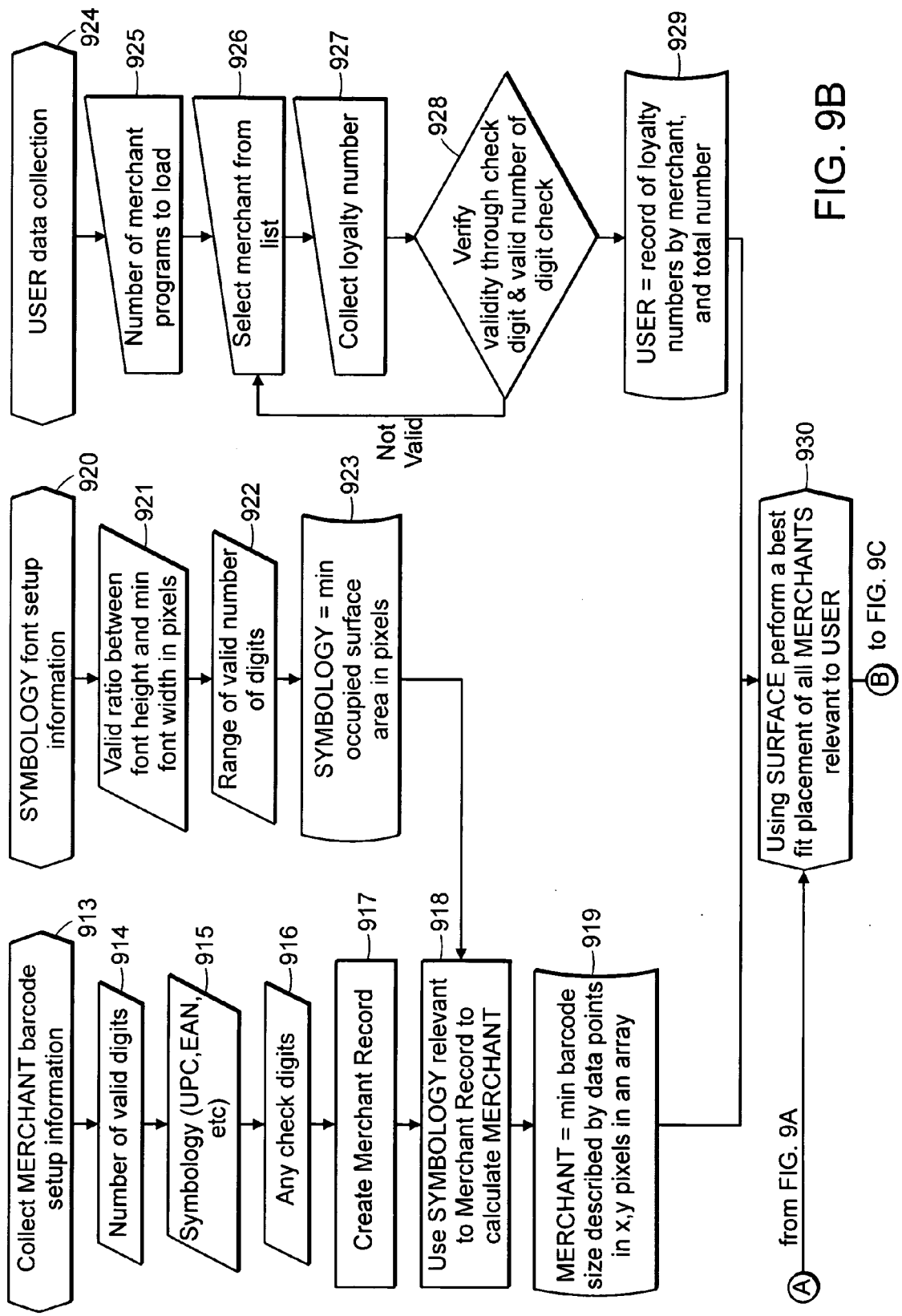
Figure 9C:
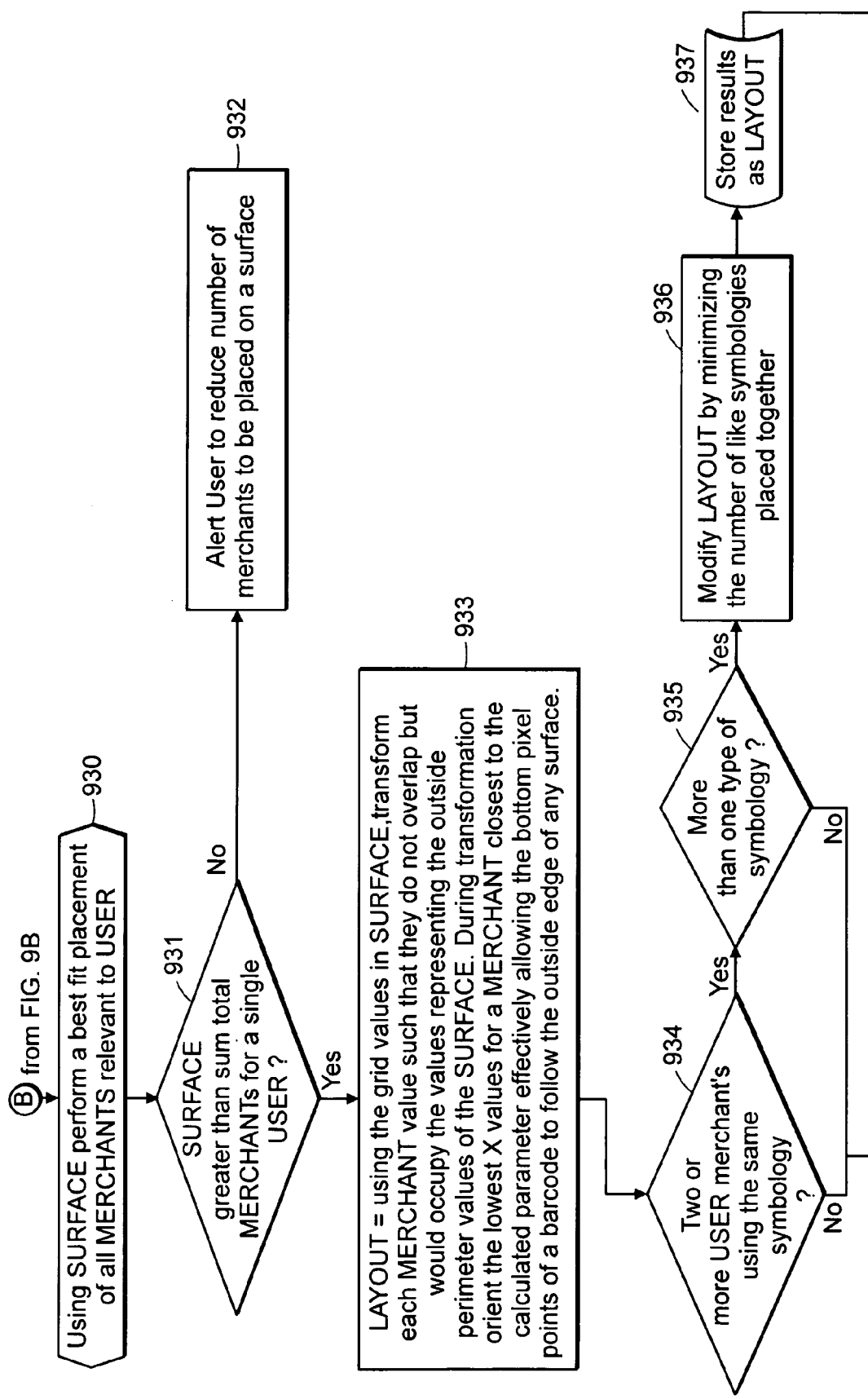
Figure 9D:
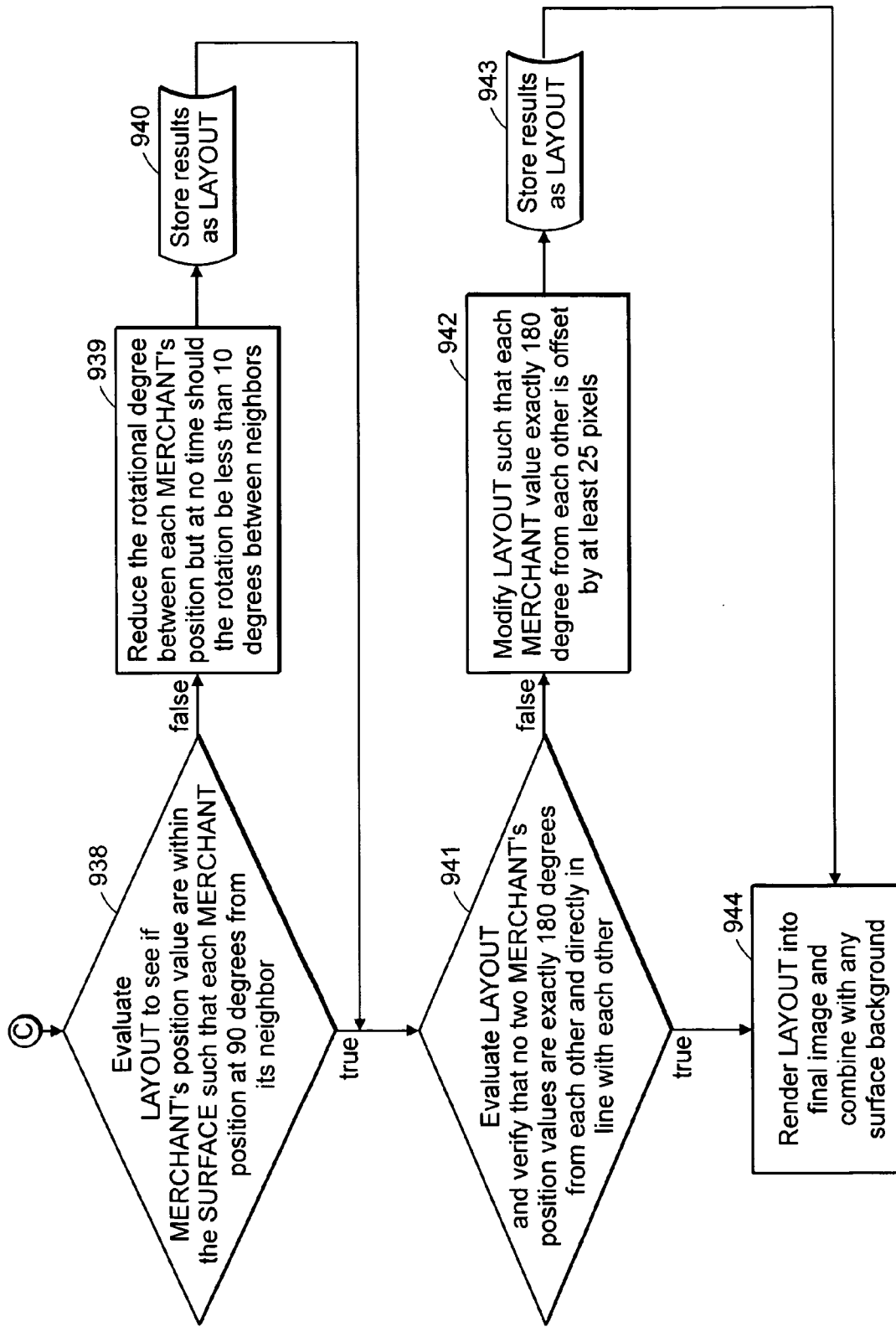

FIG. 8. shows a flattened vinyl surface 800 in accordance with an embodiment of the invention. The embodiment may be a cover for a wireless telephone or an MP3 player such as Apple's iPOD. An example of such a cover appears on the webpage http://www.speckproducts.com/for-3g.html. The surface of the cover may contain imagery or information in pre-determined regions 810, 820 and may provide for regions that are dedicated to the placement of barcodes and other information 830, 840. The images may be customized on a user-by-user basis. The layout of the barcodes and other information may be determined by the algorithm 900 outlined in FIG. 9.

FIG. 9. is a flow chart diagram that depicts an algorithm 900 for determining the optimum placement (best-fit layout) of barcodes on a particular surface. The algorithm 900 requires the collection of four key data sets: surface 901, merchant 913, symbology 920, and user 924.

The algorithm 900 first gathers information 901 about the surface upon which the barcodes and other information will be rendered. The number of external corners 902 of the surface is determined and the X-Y coordinates 904 are ascertained for each external corner. This information is used to determine the external surface area and boundaries 906 of the surface. The information may be stored in an array that contains the range of X-Y coordinates for a particular surface.

There may exist areas on the surface where nothing may be printed. The number of these areas 903, and the number of the corresponding internal corners 905 are determined. For each internal area, the X-Y coordinates 907 are ascertained, the surface area 908 is calculated, and added to the total surface area of excluded regions 910 of the surface. These steps are repeated 909 for all the internal areas. This information is particularly useful for defining pre-determined areas on the surface, such as the advertising regions in FIG. 3, or areas where graphics will be placed. The available surface area 911 is calculated by subtracting the surface area of the excluded regions 910 from the total surface area 906. The available surface area 911 may be represented as an array of X-Y coordinates 912 in the surface record 901.

The algorithm 900 then collects the merchant barcode setup information 913. For each merchant's barcode, it is important to determine whether the collected information is valid, and to determine the properties that a particular merchant's barcode readers expect when reading a barcode. The number of digits in the barcode 914 is collected, and the type of symbology 915 of the barcode is determined (for example, UPC or EAN). If a check digit 916 exists for the merchant's barcode, the information is collected concerning the check digit 916. A merchant record is created 917, and the collected information is stored in a merchant record 913.

Before the merchant can be completely defined, it is important to collect additional information about its particular type of symbology 915. The ratio 921 between the height of the bars to the width of the complete string of bars for the particular symbology 915 is determined, as well as the number of digits 922 (for example, an EAN barcode contains 13 digits). The minimum surface area 923 for the barcode is determined and stored with the other information collected for the particular type of symbology 915 in a symbology record 920.

The merchant record 913 and its corresponding symbology record 920 are then is coupled 918 and the minimum barcode size 919 for the merchant's barcode is determined. The minimum barcode size 919 is stored in an array of X-Y coordinate points in the merchant record 913.

The collection of user-specific information 924 is necessary to determine the particular set of barcodes and other information that will placed on the code carrier. The number of merchant barcodes 925 that the user wishes to include is determined. For each selected merchant barcode 926, the user's barcode number is collected 927 along with the check digit, and verified 928 by comparing the barcode number and the barcode check digit. The collected information is stored in a user record 929.

After collecting the information associated with the surface 901, merchant 913, symbology 920, and user 924, the barcodes may be arranged in a best-fit layout 930. It must be determined whether, at complete saturation, the user's selected merchant barcodes will fit within the selected surface. The number of X-Y coordinates for each of the selected merchant barcodes is summed 931. If this summed number is greater than the number of available points 912 on the surface, then the number of selected merchant barcodes to be placed on the surface needs to be reduced 932.

If the summed number is less then the number of available points 912 on the surface, then a first draft layout 933 of the barcodes is created. Utilizing the X-Y coordinate values 912 in the surface record 901, each selected merchant barcode is assigned a coordinate value such that the barcodes do not overlap and the coordinate values occupy points on the surface that represent the outside edges or the outside perimeter (for example, 0,0 or 0,34). It is important to orient each selected merchant barcode as close as possible to the edges, or perimeters, of the surface such that the bottom of each barcode tends to follow the outside edge of the surface.

The layout 933 is then further optimized by minimizing the number of merchant barcodes with the same type of symbology being placed adjacent to each other on the surface. Because barcode scanning systems are programmed to look for a particular symbology (for example, EAN-13 or UPC-A), it is beneficial to refrain from placing merchant barcodes with like symbologies adjacent to each other on the surface. To accomplish this, it is first determined 934 whether two or more of the user's selected merchant barcodes use the same type of symbology. If so, it must then be determined 935 whether more then one type of symbology exists in the list of the user's merchant barcodes. If there is only one type of symbology within the user's merchant barcodes, then the layout 933 may not be optimized based on symbology type. However, if more than one type of symbology exists, then the layout 933 may be modified 936 such that merchant barcodes with like symbologies are separated by merchant barcodes with different symbologies. This new configuration 937 is stored as the layout 933.

The layout 933 is further optimized 938 with respect to the orientation angles of the barcodes as illustrated and explained in FIG. 5. The optimum angle between neighboring merchants is ninety degrees. If the merchant barcodes cannot be placed on the surface such that for each barcode the angle between neighboring barcodes is ninety degrees, then the angle between the barcodes must be incrementally decreased 939 (to a minimum of ten degrees) until the merchant barcodes can be placed on the surface. This new configuration 940 is stored as the layout 933.

If it is determined 941 that the layout 933 contains a merchant barcode that has an orientation angle of either zero degrees or one hundred and eighty degrees with respect to another barcode, and it is directly in line with that barcode, then the layout is modified 942 such that the two barcodes are offset by a minimum of twenty-five pixels or coordinate points. This new configuration 943 is stored as the layout 933. Finally, the layout 933 is converted into a final image 944 and combined with any background pictures or graphics.

Figure 10:
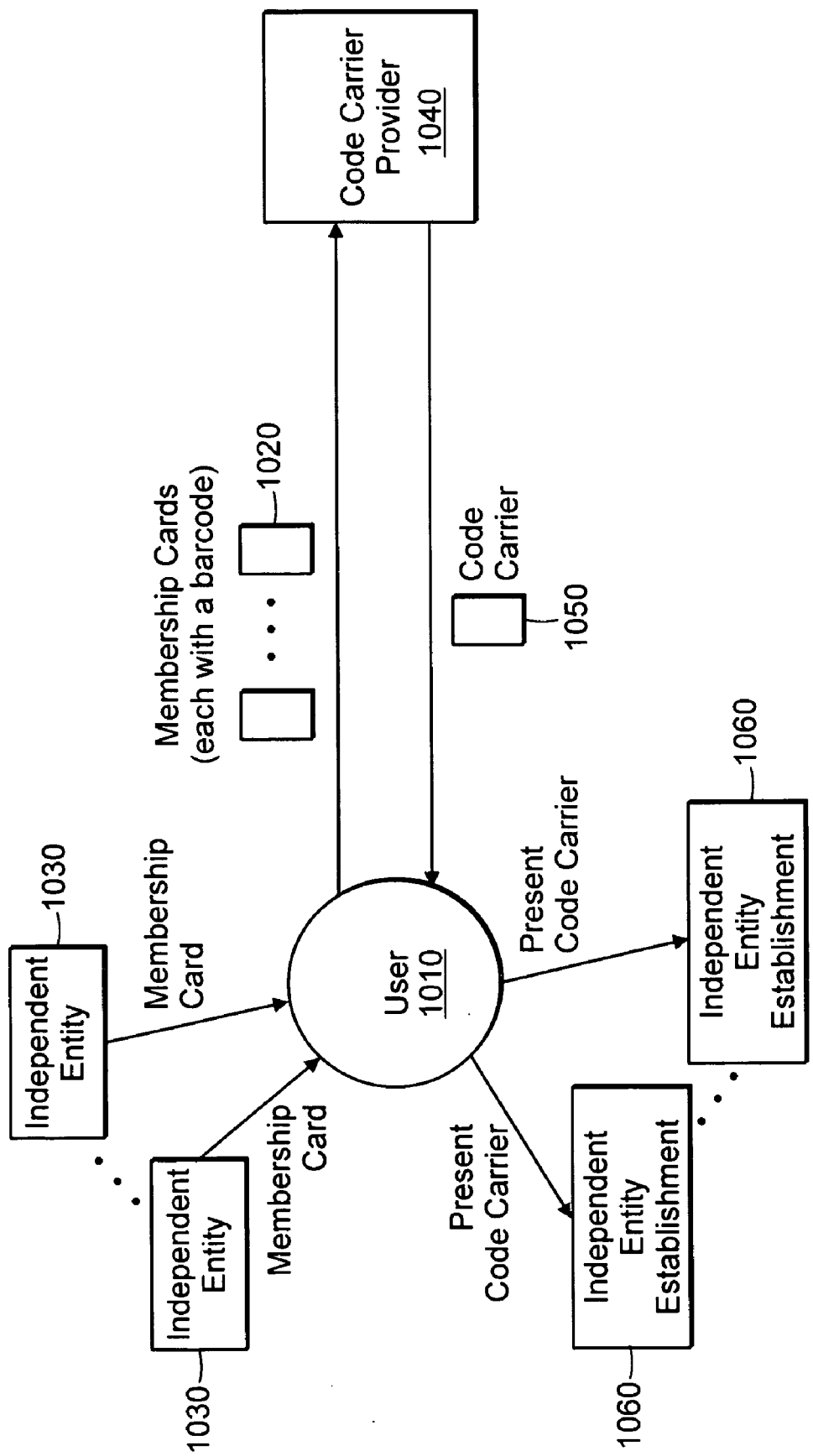
FIG. 10 shows the relationship between a code carrier, a code carrier user, a code carrier manufacturer, and independent membership card organizations.
Figure 11A:
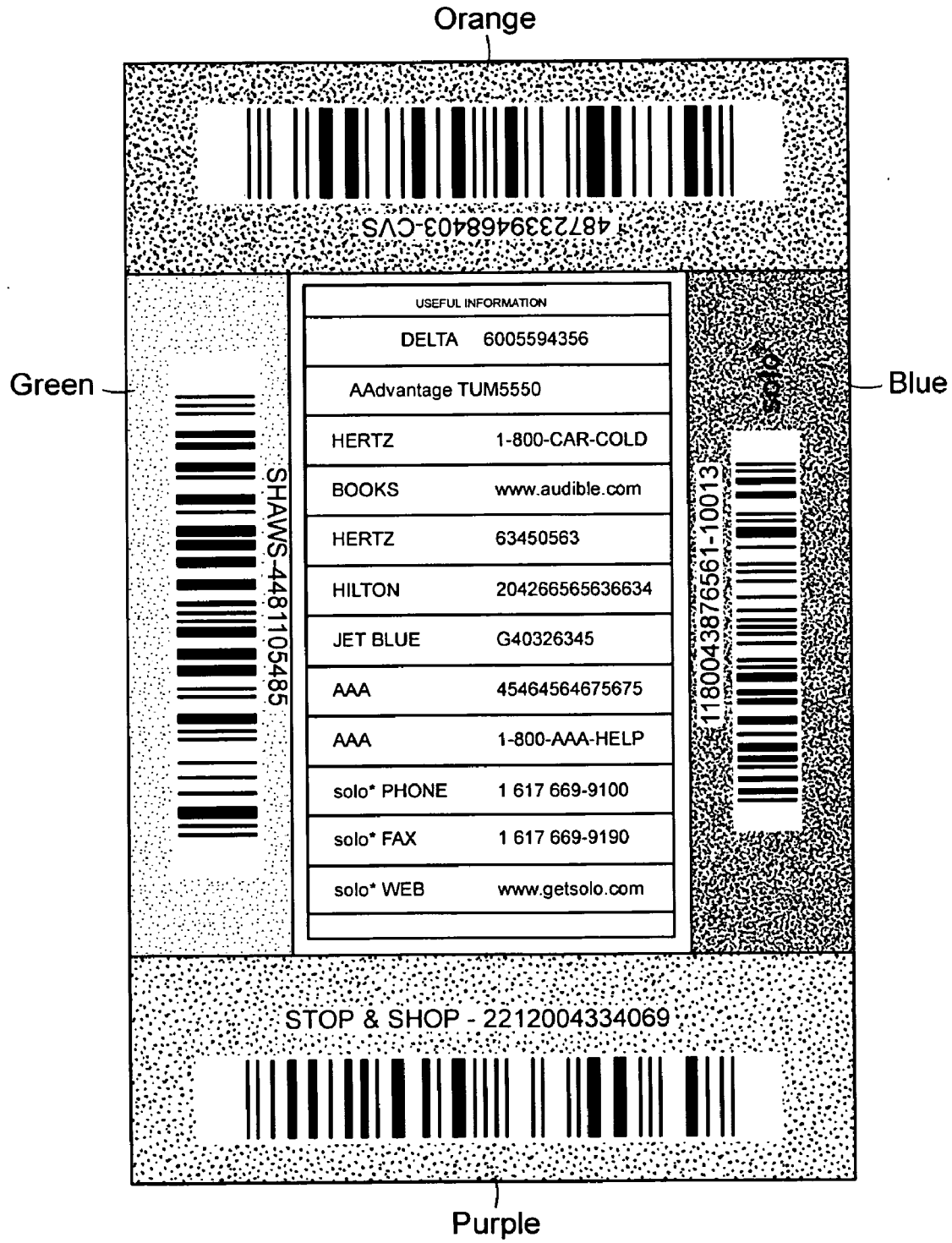
FIGS. 11A-E illustrate credit card size cards having four to eight bar codes, respectively, thereon, each code surrounded by a distinctive color.
Figure 11B:
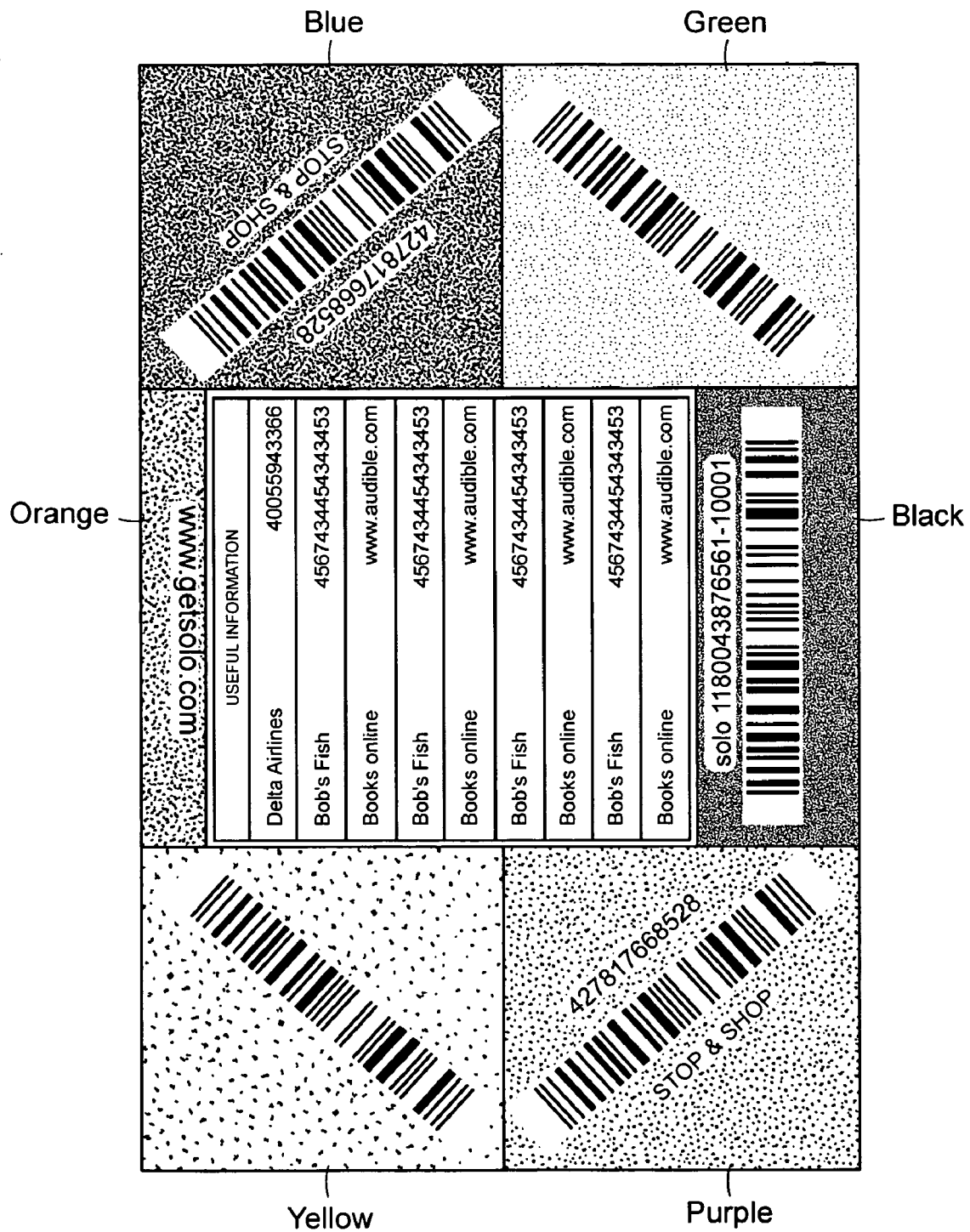
Figure 11C:
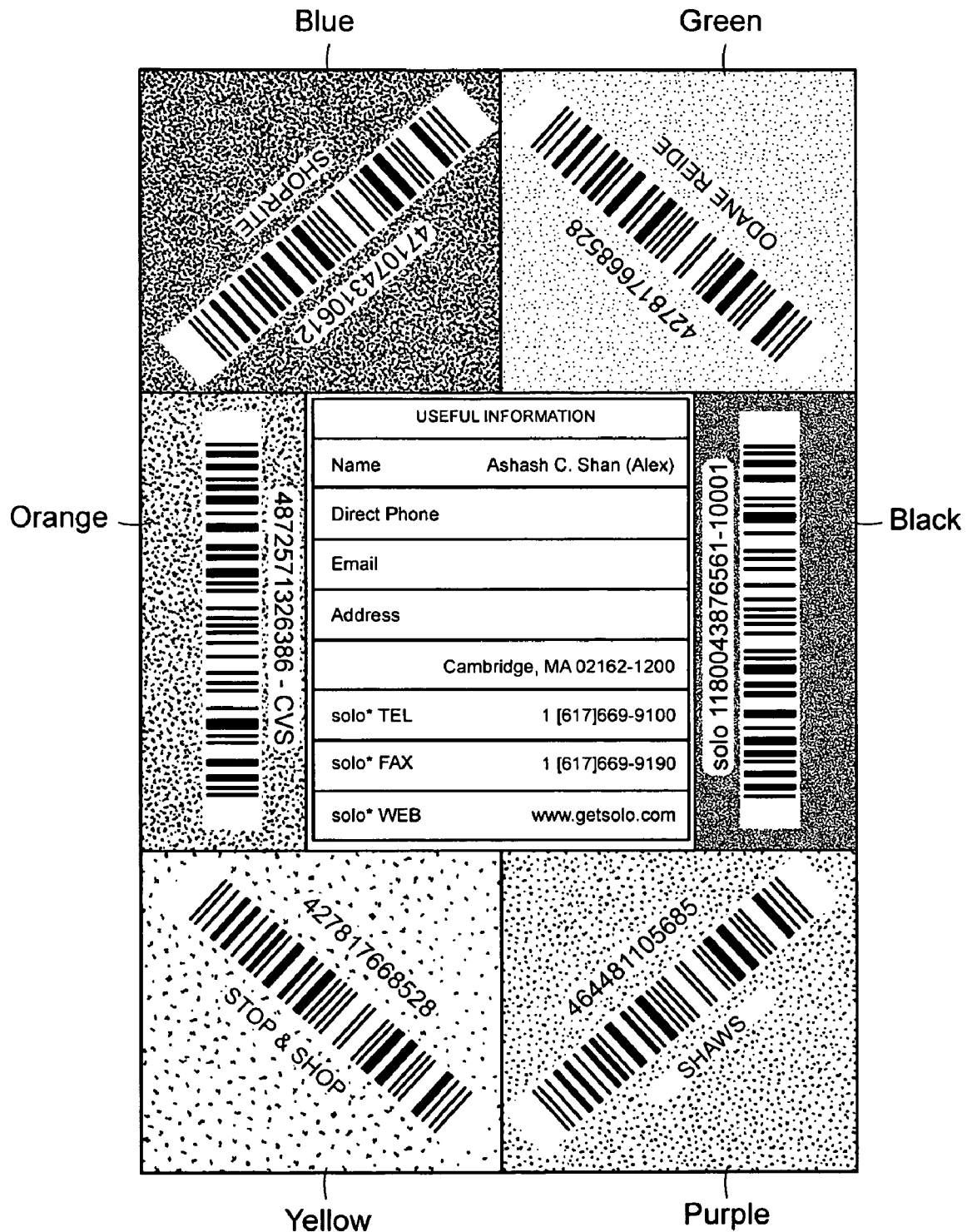
Figure 11D:
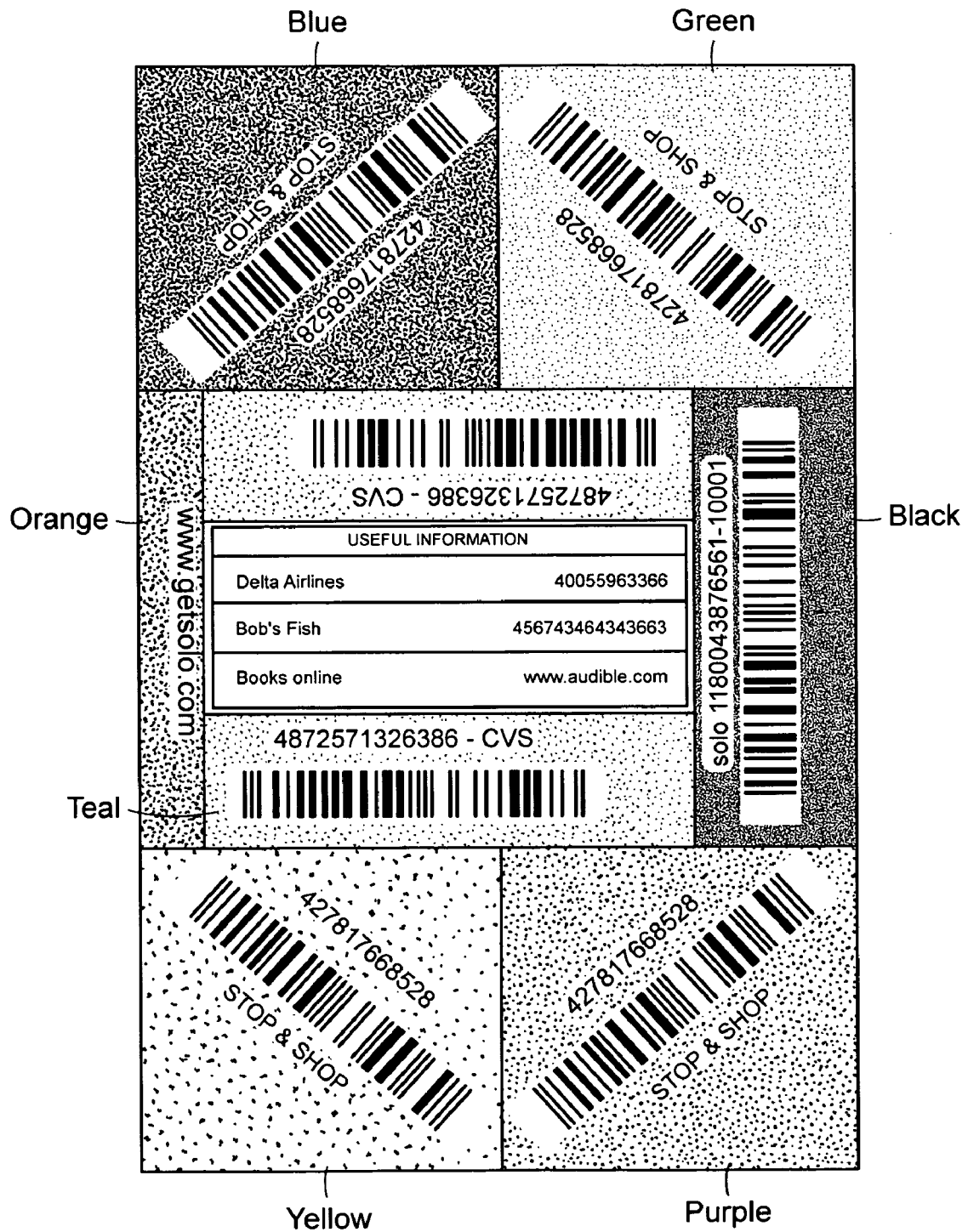
Figure 11E:
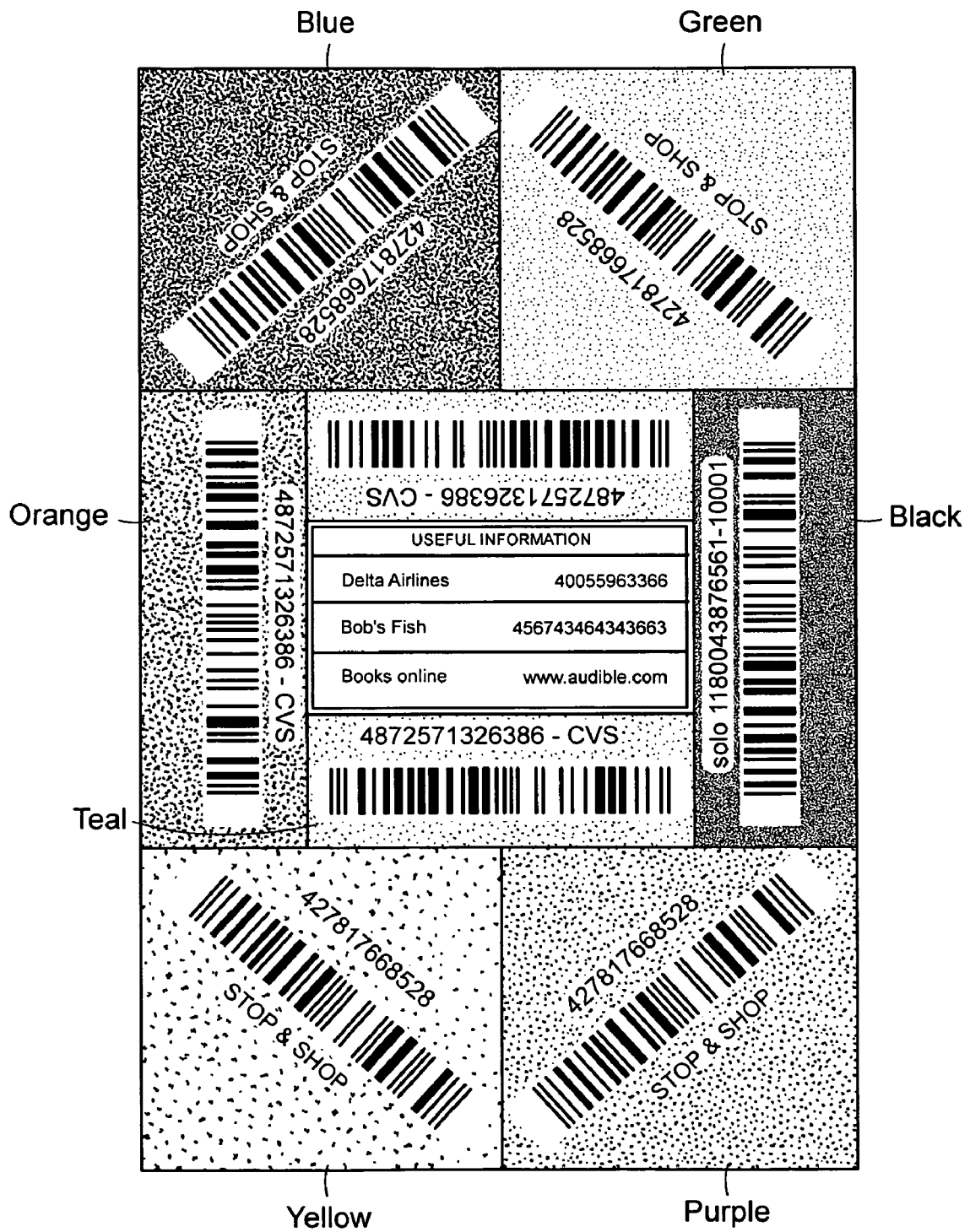

FIG. 10 shows the relationship between a code carrier, a code carrier user, a code carrier manufacturer, and independent membership card organizations. A user 1010 receives multiple membership cards 1020 from independent entities 1030, each membership card including a barcode. The user 1010 of the multiple membership cards 1020 forwards all relevant information to a code carrier provider 1040. The cards may be forwarded to the provider 1040, or the membership numbers may be entered in a form at the provider's internet website. The provider may have a database of the barcode types (e.g., code 128, UPC-A, EAN13, 3 of 9) used by various entities. With that information and the alphanumeric membership identifier, the barcode can be generated. The provider 1040 then arranges the barcodes on a code carrier 1050 and forwards it back to the user 1010. Upon receiving the code carrier 1050, the user 1010 may present the code carrier 1050 at the independent entities' establishments 1060 for reading of individual barcodes.

The card carrier provider may maintain a user account in a data base to facilitate updating a user's card carrier as new bar codes are identified or to provide additional code carriers. The data base may also be used to provide other code carriers such as RFID, smart card, or magnetic stripe devices, or devices with mixed technologies such as bar code and RFID.

Code carriers may be purchased on-line or from a retailer. When purchased from a retailer, the user may receive an account number to enable access to an on-line supplier. Code carriers may also be given away in promotional efforts.

Optimized arrangements of four to eight barcodes on credit card sized (cr-80) cards are presented in FIGS. 1A-E. In each example, the region surrounding each barcode is a distinct color. This facilitates use of the card in that the owner of the card may simply instruct a store clerk or the like to "scan yellow" or any other appropriate color.

Figure 12A:
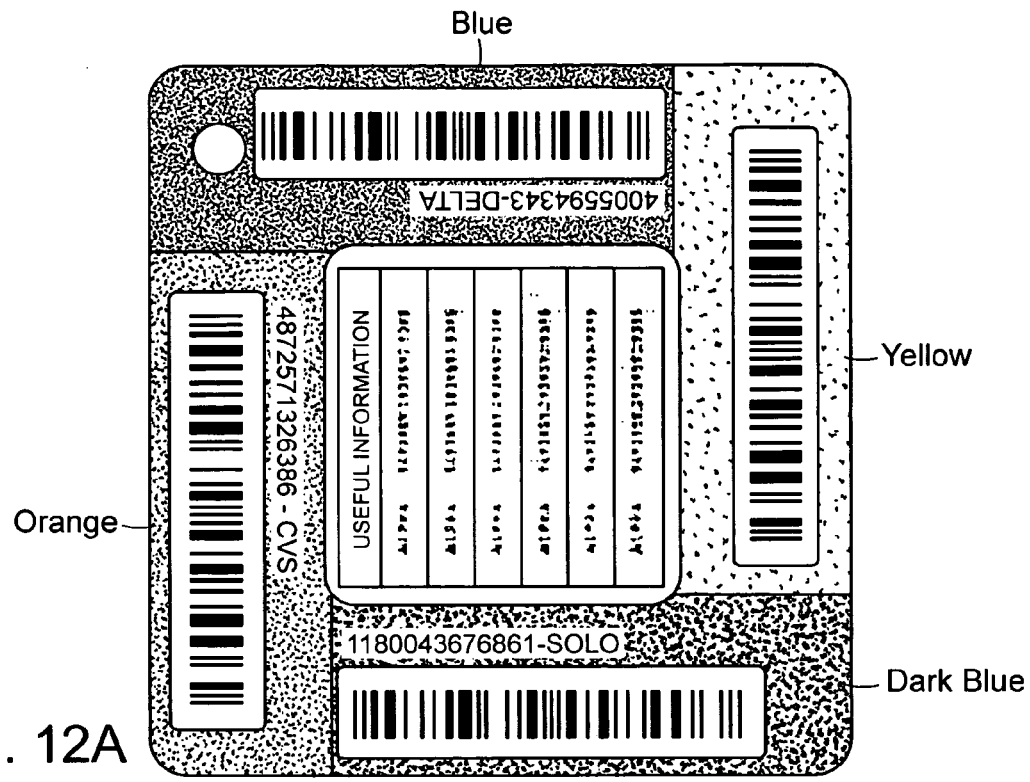
FIGS. 12A and 12B illustrate two sides of a key fob supporting four bar codes per side, each code surrounded by a distinctive color.
Figure 12B:
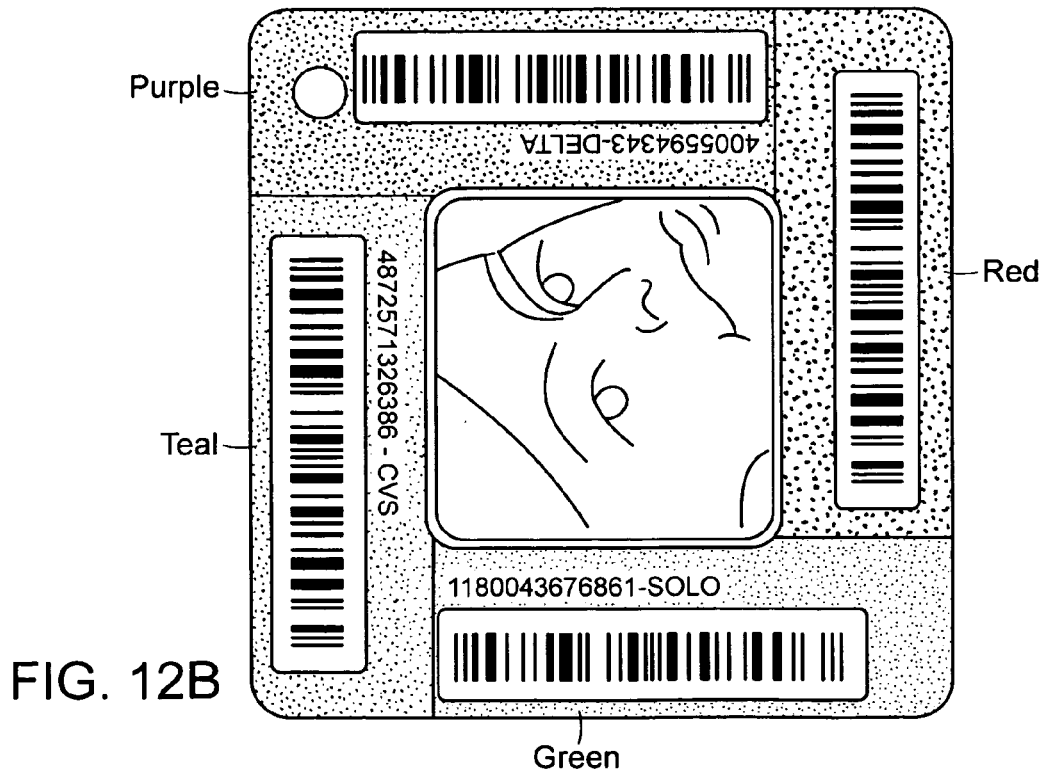

FIGS. 12A and 12B illustrate two sides of a key fob, each side supporting four bar codes surrounded by distinctive colors.

Further embodiments of the invention may take electronic form. For example, the provider may download, to a PDA device or other compact electronic display device, any number of entity associated barcodes. The user may then call up individual barcodes as needed. Such an implementation relies on a non-reflective display screen so that the barcode scanner is able to distinguish the barcode segments in the electronic display.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of manufacturing a code carrier comprising:
   receiving identifiers from a user, the identifiers corresponding to independent entities;
   establishing a user account and storing the identifiers in the user account;
   providing barcodes corresponding to the identifiers on the code carrier; and
   forwarding the code carrier to the user.

2. The method of claim 1 wherein the code carrier comprises:
   a substrate; and
   the barcodes corresponding to the identifiers are printed on the substrate with adjacent barcodes angled relative to each other, including adjacent barcodes angled obliquely relative to each other.

3. The method of claim 2 wherein
   each barcode is associated by a distinctive color that distinguishes the barcode from other barcodes.

4. The method of claim 1 wherein the barcodes include barcodes for product related coupons.

5. The method of claim 2 wherein the substrate includes one of: a card, a key tag, or a cover.

6. The method of claim 1 wherein the barcodes include at least one barcode of a store account.

7. The method of claim 1 wherein the barcodes include at least one barcode of a membership account.

8. The method of claim 1 wherein receiving includes receiving a graphic personalized to the user and providing includes providing the graphic on the code carrier.

9. The method of claim 1 wherein receiving includes receiving a set of data in addition to the identifiers and providing includes providing the set of data on the code carrier.

10. The method of claim 1 further including arranging the barcodes on the code carrier such that no barcode is within ten degrees of rotation from another barcode.

11. The method of claim 1 wherein the arranging of the barcodes is automated.

12. The method of claim 1 wherein the bar codes are surrounded by distinctive colors.

13. A method as claimed in claim 1 wherein the code carrier is an electronic device having a display and the bar codes are stored electronically in the device for display on the display.

14. The method of claim 2 wherein at least five barcodes are printed on a side of the substrate.

15. A method of presenting barcodes associated with independent entities comprising a user performing steps of:
   receiving identifiers from the individual entities;
   opening an account with a code carrier provider and forwarding the identifiers to the code carrier provider, the provider maintaining a data base of identifiers for accounts;
   receiving from the provider a common code carrier having multiple barcodes corresponding to identifiers of independent entities; and
   presenting the common code carrier for reading of individual barcodes.

16. The method of claim 15 wherein forwarding includes forwarding to the code carrier provider a graphic personalized to a user, and the received code carrier includes the graphic personalized to the user.

17. The method of claim 15 wherein forwarding includes forwarding at least one set of data, in addition to the identifiers, to the code carrier provider and the received code carrier includes the set of data in addition to the barcodes.

18. The method of claim 15 wherein forwarding includes forwarding using an internet connection.

19. The method of claim 15 wherein presenting the code carrier includes blocking all barcodes except a relevant barcode.

20. The method of claim 15 wherein the bar codes are surrounded by distinctive colors.

21. A method of presenting bar codes associated with independent entities comprising:
   opening an account with a code carrier provider and providing identifiers for individual entities to the provider, the provider maintaining a database of identifiers for accounts;
   receiving from the provider multiple barcodes corresponding to identifiers of independent entities stored on a common code carrier;
   presenting the common code carrier for reading individual bar codes.

22. A method as claimed in claim 21 wherein the common code carrier is an electronic device having a display and the bar codes are stored electronically on the device for display on the display.

* * * * *

UNITED STATES PATENT AND TRADEMARK OFFICE
CERTIFICATE OF CORRECTION

PATENT NO. : 7,624,925 B2 Page 1 of 1
APPLICATION NO. : 11/355036
DATED : December 1, 2009
INVENTOR(S) : Ashesh C. Shah It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 752 days.

Signed and Sealed this

Twenty-sixth Day of October, 2010

David J. Kappos
*Director of the United States Patent and Trademark Office*